June 9, 1936.  O. U. ZERK  2,043,874
WHEEL COVER AND SECURING MEANS THEREFOR
Filed Oct. 3, 1931  2 Sheets-Sheet 1
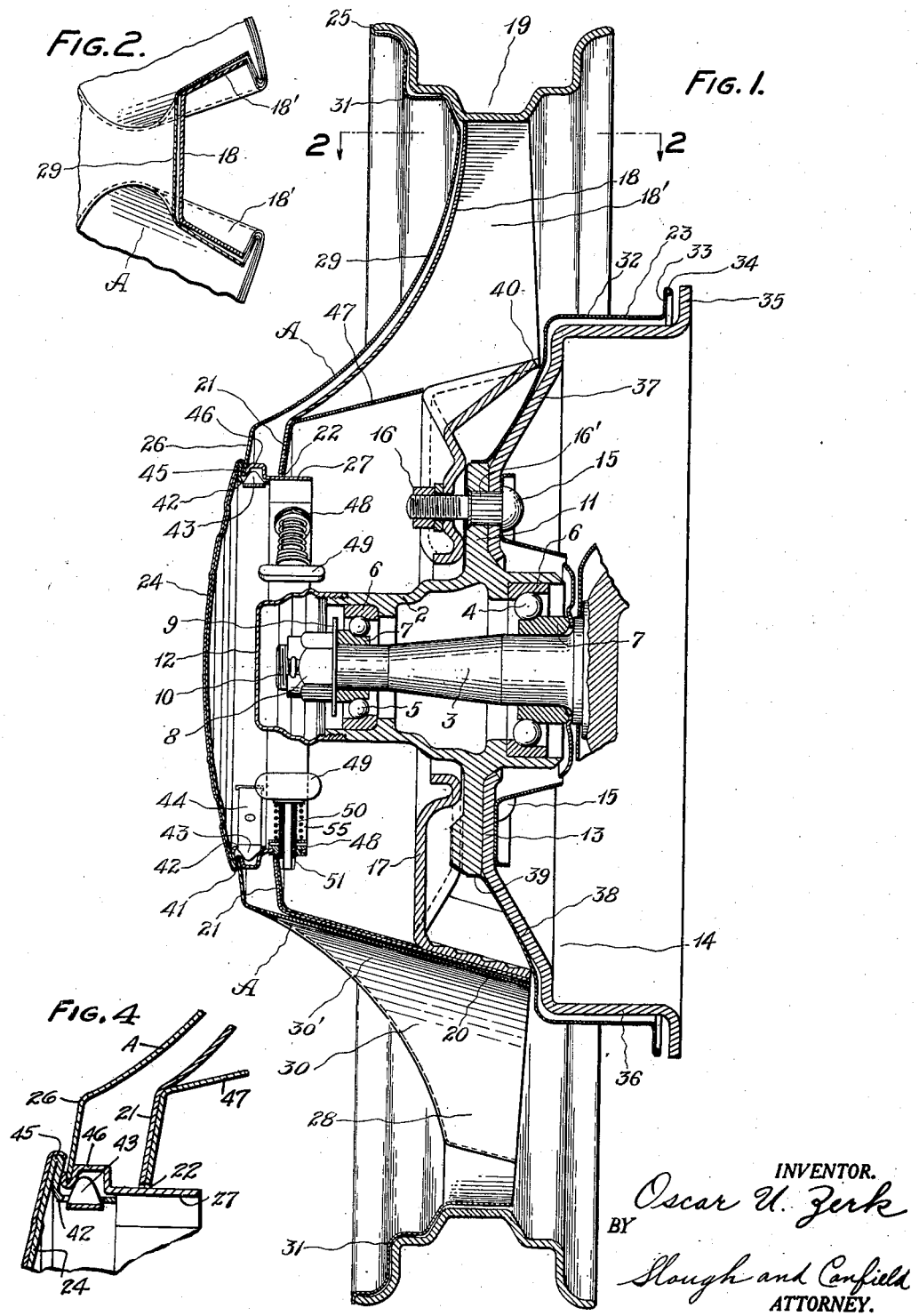
INVENTOR.
Oscar U. Zerk
BY
Slough and Canfield
ATTORNEY.

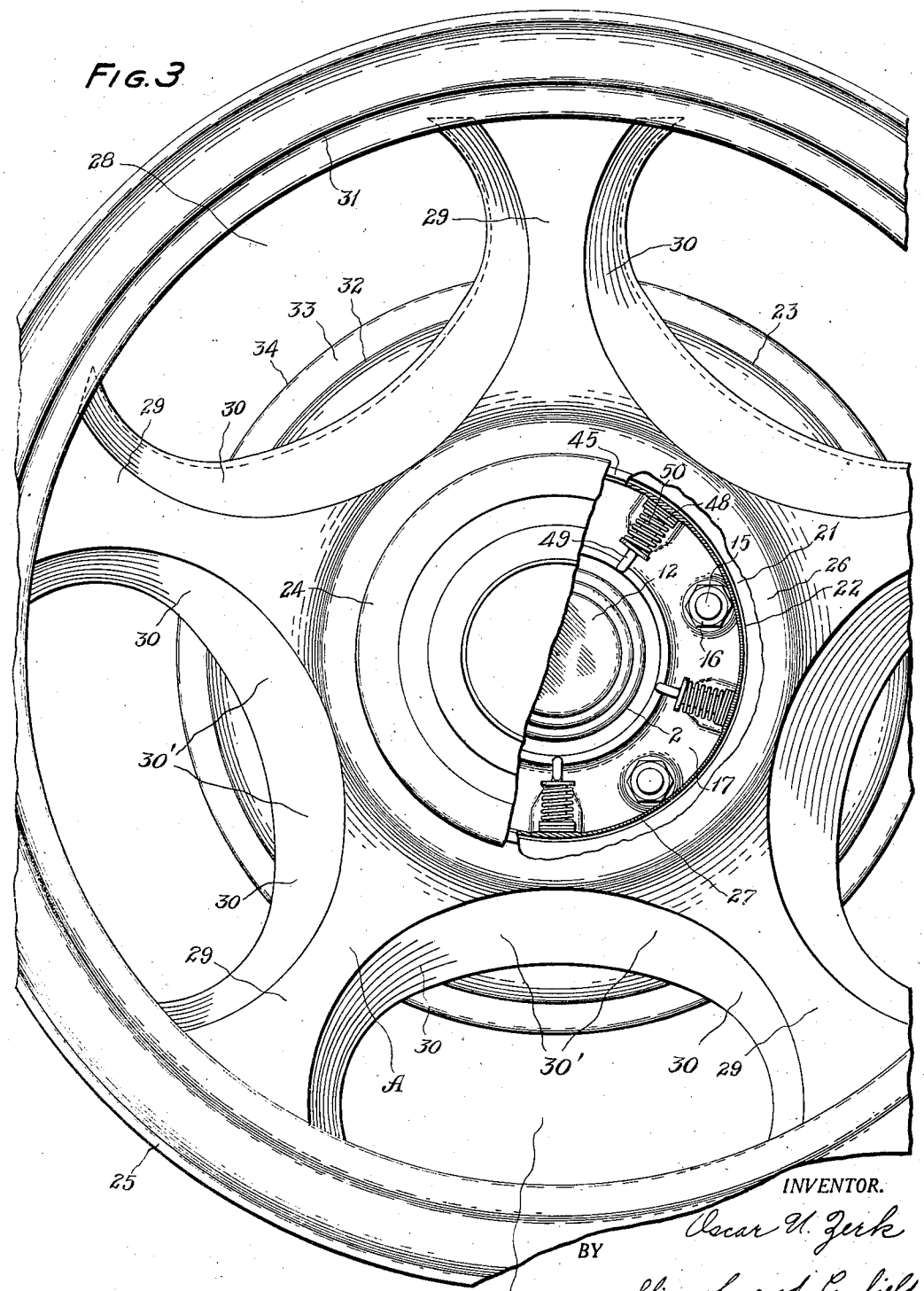

Patented June 9, 1936

2,043,874

UNITED STATES PATENT OFFICE 2,043,874

WHEEL COVER AND SECURING MEANS THEREFOR

Oscar U. Zerk, Cleveland, Ohio

Application October 3, 1931, Serial No. 566,615

6 Claims. (Cl. 301—37)

My invention relates to wheel covers and securing means therefor, which are applicable not only to artillery types of wheels, but also to covers for other types of wheels.

In my co-pending applications, Serial Nos. 540,306, 540,307, 540,308, and 540,309, all filed May 27, 1931, I have described a series of wheel covers of this general class.

An object of my invention is to provide certain elements of improvement to wheel covers of the general types disclosed in my aforesaid copending applications.

Another object of my invention is to provide improved means for securing the wheel cover to the wheel in such a manner that the cover attaching means may be situated inside of the outer hub and can be reached after the outer hub cap has been taken away from the wheel.

Another object of my invention is to provide improved securing means for wheel covers which will permit the cover to remain in place on the wheel, while the wheel is detached from the inner hub of the wheel, to which it is adapted to be connected for use.

Another object of my invention is to provide improved attaching means for wheel covers which will not become loose when the wheels carrying said covers are in use on an automotive vehicle, or the like.

Another object of my invention is to provide an improved sheet metal cover adapted to be placed over wheels of the channeled spoke type and to cover the same with sufficient play between the cover and the spokes to facilitate easy assembling and to prevent sticking of the cover on or between the spokes.

Another object of my invention is to provide an improved sheet metal cover for wheels having channeled shaped spokes which may be relatively spaced from the wheel more at central portions than at peripheral portions to facilitate ready assembling of the cover and wheel without undue sticking of the cover on the wheel.

Another object of my invention is to provide improved attaching means which permit removal of the wheel from its place on the automotive vehicle with the cover secured to said wheel as a unit.

Other objects of my invention and the invention itself will become more apparent from the following description of an embodiment of my invention, wherein reference is made to the accompanying drawings forming a part of this specification.

In the drawings:—

Fig. 1 is a diametrical sectional view through a wheel and cover therefor which is an embodiment of my invention;

Fig. 2 is a section taken on the line 2—2 of Fig. 1;

Fig. 3 is a plan view of the front of the wheel illustrated in the foregoing figures wherein a fragment of the hub cap is shown as broken away to expose interior parts comprising attaching means for the cover.

Fig. 4 is a view of a part of Fig. 1 drawn to a larger scale.

Referring now to the different figures of drawings in all of which like parts are designated by like reference characters, the drawings illustrate a wheel of the artillery type made preferably entirely of sheet metal in order to form a sturdy inexpensive wheel construction having all of the advantages of prior wheels of the artillery type and the additional advantages inherent in the use of the sheet metal material.

However, my invention is not limited to the use of a wheel of the type described except in some of its more specific phases, as will be apparent from the more specific objects previously related and the following description of the said embodiment, and the included claims.

Referring to the drawings, at 2 I show a tubular wheel hub casting adapted to be mounted on an axle 3 of an automotive vehicle. The hub casting 2 is preferably provided with a radial mounting flange 11 disposed near the inner end, respectively, of the hub casting, although, the flange is readily susceptible of a different positioning from that specifically shown.

Bolts 15 in cooperation with nuts 16 removably secured on their threaded ends, securely clamp the vehicle wheel proper to the hub casting 2, the bolts being projected through aligned apertures of said wheel flange and the aforesaid hub casting flange apertures.

Each bolt 15 may be made non-rotatable by virtue of the interlocking nature of the contact between the outer surface of its neck 16' and the walls bordering the apertures through the hub flange 11.

The wheel comprises besides the hub flange element 17, substantially channel shaped sheet metal spoke portions 18, whose sides are tapered from the ends in the radial direction the spokes 18 being rigidly secured to the inner surface of a tire supporting rim 19 as by welding, riveting, or in any other suitable manner.

Fig. 2 illustrates that the lateral walls 18' of the channel shaped spoke 18 may be in slightly relatively divergent directions throughout the lengths of said spokes.

The hub flange element 17 of the wheel, annular in form, is preferably welded or otherwise affixed by its peripheral portion 20, to the inner ends of the spokes 18 toward the rear thereof. The outer faces of the spokes flare outwardly towards the center of the wheel where they merge with a more forwardly disposed hub flange 21, which is of annular form, and provided with a central aperture 22.

The spokes 18 are preferably separated throughout their intermediate portions disposed between the rim 19 and the peripheral portion 20 of the hub supporting element 17.

The above brief description of the wheel, per se, may be supplemented by reference to my copending application, Serial No. 566,616, filed October 3, 1931, wherein the wheel per se is more specifically described, the description thereof herein being abbreviated since my invention is not limited to said form of wheel, the same being taken merely by way of example.

Such wheels as that disclosed in my said copending application commonly are provided with a closure cap for the central aperture 22 within the outwardly disposed annular hub flange 21. In accordance with the principles of my present invention, I employ a closure cap 24 which is secured within a central aperture of my improved wheel cover A, said cover and cap serving to close the hub opening of the wheel per se and I further provide means associated with said cover and cap adapted to facilitate removably securing said cap to the cover, and to maintain the cover in position on the wheel.

The entire cover exclusive of the cap 24 above referred to and to be described, is preferably formed as a single annular sheet metal stamping having a peripheral rim cover portion 31 terminating in a flange 25 resiliently engaging preferably the outer edge surface of the tire rim 18, by virtue of inwardly directed pressure made effective by means and in a manner to be described. The cover is formed with inclined curvilinear outwardly axially facing walls 29 extended from the rim portion 31 to a central flange 26.

Each of the wall portions 29 is integrally joined to generally inwardly axially extending side wall portions 30, providing wheel spoke embracing channels to cover the wheel spokes 18 including their divergent lateral walls 18', and at the same time the portions 30 are preferably divergent and spaced from the spokes 18 throughout their length, as illustrated in Figs. 1 and 2.

Openings 28 are provided between the inclined spoke embracing cover portions 30 of adjacent spokes. The exact contour of the channeled spoke cover portions is not essential but may conform generally to the form of the wheel spokes to be covered. It is believed that the drawings clearly illustrate the preferred form.

The cap 24 referred to preferably comprises a pair of superposed sheet metal discs of preferably concavo-convex form, the outer disc having its peripheral portion inturned as at 41, Fig. 1, to enfold the peripheral edge of the inner disc which, in turn is inturned to provide a projection 42 forming a cylindrical flange on the cap element. At intervals the flange 42 is apertured and a plurality of locking detents 43 preferably mounted on leaf springs such as 44 are pressed by said springs outwardly through said apertures.

An inwardly directed cylindrical flange 27 is secured to the inner border of the annular flange 26 of the wheel cover by bending its outer end about the edge portion of said flange as at 45 to securely enfold said edge portion. The flange 27 is provided with an outwardly projecting annular recessed portion 46 disposed inwardly from its fold 45 and adapted to receive the spring-pressed detents 43 when the cap is placed over the aperture of the cover with the flange portion 42 of the inner disc element of said cap telescoped within the outer end portion of the flange 27 supported by the sheet metal cover.

The inner end of the flange 27 projects inwardly through and beyond the aperture 22 of the sheet metal hub flange 21 and is apertured at intervals, and interiorly threaded sheet metal eyelets 48 are securely positioned on said flange 27 within said apertures. Clamping screws having enlarged heads 49, threaded stems 50 and tapered wedge-shaped ends 51 are adjustably screw-threaded through said eyelets and by their tapered wedge ends 51 make wedging engagement with the inner surface of the flange 21 bordering the aperture 22, whereby when the screws are manually turned by their heads 49, the tapered ends 51, engaging the inner surfaces of the flange 21, will draw the flange 27 slightly inwardly to communicate inwardly directed pressure therefrom to the sheet metal stamping A through the annular flange 26 thereof. The inwardly directed pressure thereby effected by the adjustable screws will be effective to maintain resilient pressure contact between the peripheral flange 25 of the cover and the lateral rim flange of the rim 19 to maintain the cover securely on the wheel and in spaced relation therefrom except for the contact at the rim flange and with the hub portion of the wheel as described.

A compressed helical spring 55 surrounds the threaded stem 50 and abuttingly reacts at opposite ends upon the head 49 and the eyelet 48 and by the resilient longitudinal pressure thus exerted on the stem 50 takes up lost motion in the threads, prevents loosening and rattling thereof and acting as a friction device prevents rotation of the stem 50 in the direction to loosen the same.

The adjustable screws 50 are rotatably displaced from alignment with the wheel bolts 15 and nuts 16 therefor, whereby after removing the cap 24 by a pulling pressure exerted thereon to overcome the effect of the spring mounting for the detents 43, a straight socket wrench may be inserted over the nuts 16, said wrench passing between adjacent screws 50.

Having thus described my invention in certain embodiments, I am aware that numerous and extensive departures may be made from the embodiments herein illustrated and described, but without departing from the spirit of my invention.

I claim:

1. A sheet metal cover for vehicle wheels of the type comprising a central hub portion having inwardly radially extending shoulder means, the cover comprising a central nave portion and a portion extending radially outwardly therefrom, the radially outwardly extending cover portion having peripheral portions engageable with portions of the wheel rim, securing means comprising a plurality of screw-threaded elements on the cover having portions adapted to be moved to overlap the said shoulder means of the hub portion when screwingly turned in one direction draw the cover toward the wheel, and resilient means maintaining the said elements in adjusted position.

2. A cover for wheels of the type comprising a hub having a generally radial flange, the cover comprising an annular rim covering portion, a central outwardly axially projecting portion joined thereto and having a central perforation, a perforation covering cap removably attached to the central portion, means on the central portion disposed axially inwardly of the outer termination thereof for removably attaching the cover to the hub, said means comprising a generally tubular portion projecting inwardly axially from the central portion of the cover, and outwardly radially extending elements supported on the tubular portion and engageable with the hub flange.

3. A sheet metal cover for wheels of the type comprising a hub element provided with an inwardly directed flange portion, the cover comprising a body portion having a central perforation, cover attaching means disposable within the hub operable through the perforation for removably attaching the cover by its central portion to the said hub flange, and a cap for substantially closing the perforation and means removably attaching the cap to the central portion of the cover.

4. A sheet metal cover for wheels of the type comprising a central hub portion having inwardly radially extending shoulder means, the cover comprising a central nave portion and an inherently resilient portion extending radially outwardly therefrom, the radially outwardly extending cover portion having peripheral portions engageable resiliently with peripheral portions of the wheel, securing means comprising a plurality of screw-threaded elements on the cover having portions adapted to be moved to overlap the said shoulder means of the hub when screwingly turned in one direction to draw the cover toward the wheel and engage it resiliently therewith.

5. In a sheet metal cover for wheels of the type comprising an axially outwardly extending flanged hub element, a wheel masking centrally perforated stamping, operable securing means supported on the stamping accessible through the perforation engageable with the wheel hub flange to draw the stamping toward the wheel, comprising a generally radially disposed screw element having a smooth surface portion adapted to overlap the hub flange when screw-turned in one direction and a cap for covering the perforation detachably connected to the stamping, the cap and stamping completely covering the securing means.

6. In a wheel cover for wheels of the type comprising generally radial spoke portions and a generally circular series of wheel hub attaching elements, a sheet metal stamping for masking portions of the wheel, a plurality of securing means associated with the stamping adapted to be engaged with portions of the wheel to secure a stamping on the wheel, the securing means being disposed in a generally circular series generally coaxial with the wheel attaching elements, the stamping having generally channel form spoke simulating portions adapted to nest with wheel spoke portions to predetermine relatively rotated positions of the stamping and wheel to effect relative staggering relation of the said securing means and attaching elements.

OSCAR U. ZERK.